United States Patent [19]

Jolissaint

[11] Patent Number: 5,103,449
[45] Date of Patent: Apr. 7, 1992

[54] PBX TRANSPARENT ANI AND DNIS USING VRU

[75] Inventor: Charles H. Jolissaint, Sunnyvale, Calif.

[73] Assignee: International Business Machines Corporation, Armonk, N.Y.

[21] Appl. No.: 432,133

[22] Filed: Nov. 3, 1989

[51] Int. Cl.$^5$ .............................................. H04J 3/12
[52] U.S. Cl. ........................................ 370/110.1; 379/127
[58] Field of Search ........................ 370/58.2, 110.1; 379/127

[56] References Cited

U.S. PATENT DOCUMENTS

| 4,027,104 | 5/1977 | Levitt et al. ................... 379/127 |
| 4,435,199 | 8/1985 | Zink . |
| 4,475,009 | 10/1985 | Rais et al. |
| 4,677,663 | 6/1987 | Szlam . |
| 4,694,483 | 9/1987 | Cheung . |
| 4,742,538 | 5/1988 | Szlam . |
| 4,788,682 | 11/1988 | Vij et al. ................... 370/110.1 |
| 4,797,911 | 1/1989 | Szlam et al. .................. 379/67 |
| 4,894,857 | 1/1990 | Szlam et al. .................. 379/246 |
| 4,920,562 | 4/1990 | Hird et al. ................... 379/132 |

OTHER PUBLICATIONS

"Telephone Identifier Interface", IBM Technical Disclosure Bulletin, vol. 19, No. 5, Oct. 1976, R. L. Brady et al.
"Electronic Automatic Number Identification Circuits", IBM Technical Disclosure Bulletin, vol. 19, No. 8, Jan. 1977, R. L. Brady.

Primary Examiner—Douglas W. Olms
Assistant Examiner—Melvin Marcelo
Attorney, Agent, or Firm—Perman & Green

[57] ABSTRACT

Method and apparatus to enable a PBX or CBX to receive ANI and DNIS information and to provide this information to customer business applications. One embodiment discloses a trunk adapter 20 that includes an ISDN primary or basic interface 20A that receives ANI and/or DNIS information from a network provider's switch. The trunk adapter, in response to answer supervision, employs DTMF signals to outpulse this information, via a novel protocol, over a T1 interface, through a PBX 14 to a VRU 14A. The VRU 14A subsequently provides the ANI and/or DNIS information to a Host data processor 12. The PBX 14 is essentially "transparent" to the DTMF tones that are used to convey the ANI and DNIS information from the trunk adapter 20 to the VRU 14A. In another embodiment the network provider's switch directly provides the ANI and/or DNIS information via DTMF in accordance with the novel protocol. The protocol comprises DTMF digits having the format "* ANI * DNIS * ", where both ANI and DNIS are digits corresponding to the billing number of the call and the number dialed, respectively, and the first phoneset star "*" digit signals the beginning of the DTMF packet of information, the second separates the ANI data filed from the DNIS data field, and the third terminates the packet of information.

16 Claims, 1 Drawing Sheet

PBX TRANSPARENT ANI AND DNIS USING VRU

FIELD OF THE INVENTION

This invention relates generally to telephony equipment and, in particular, to method and apparatus for providing collection of ANI and DNIS information directly by a VRU through a PBX that supports ring-down of call connections from a network and return of answer supervision to the network upon VRU answer.

BACKGROUND OF THE INVENTION

Several protocols are known to exist for passing a caller's phone number and the called phone number between a customer's Private Branch Exchange (PBX) and a phone network. By example, one network provider offers Integrated Services Digital Network (ISDN) in-band ANI services that provide combinations of Automatic Number Identification (ANI), that is the caller's billing number, and Dialed Number Identification Service (DNIS) providing up to the last seven digits of the called number. The ANI and DNIS information is provided in-band to PBXes in order to identify the caller and to identify what services were dialed by the caller. However, to use this protocol for in-band ANI and/or DNIS PBX vendors are required to create interfaces for the protocol such that PBXes may employ this information to provide routing, queuing priority, and intelligent answering capabilities. One problem in creating such an interface relates to a requirement that existing PBXes be modified, such as by providing new software, in order to collect the ANI and DNIS information. Such modifications are generally undesirable both from a customer's and a vendor's viewpoint.

It is thus one object of the invention to provide a novel protocol that requires only network protocol changes in order to enable existing PBXes to receive ANI and DNIS and provide this valuable information to customer business applications.

It is another object of the invention to provide method and apparatus that, in response to an incoming call, returns a call accepted signal to a network and transmits DTMF-encoded ANI and/or DNIS signals over a T1 trunk group to and through a PBX, the transmitted information being expressive of ANI and/or DNIS information.

SUMMARY OF THE INVENTION

The foregoing problems are overcome and the objects of the invention are realized by a method of providing ANI and/or DNIS information to a user of a network. The method includes a step of transmitting a packet of information using DTMF signals in accordance with a predetermined protocol having a format "* ANI * DNIS * " wherein ANI and DNIS each comprise digits corresponding to the billing number of the call and the number dialed, respectively. The first phoneset "*" digit indicates the beginning of the packet of information, the second phoneset "*" digit separates the ANI digits from the DNIS digits, and the third phoneset "*" digit terminates the packet of information.

The invention also teaches method and apparatus for providing ANI and/or DNIS information from a network provider's switch to a network provider's user or customer site. In response to an incoming call there is returned to the network a signal indicating that the incoming call has been accepted at the network provider's customer site. Responsive to the receipt of this signal there is transmitted information with DTMF signals to and through the customer's local branch exchange. The information is expressive of ANI and/or DNIS information and is transmitted in accordance with the format described above. The information is received at the customer site and may be employed to affect further call processing, such as to identify a destination phone number or call answering resource to which to direct the call.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF PREFERRED EMBODIMENTS OF THE INVENTION

Figure 1:
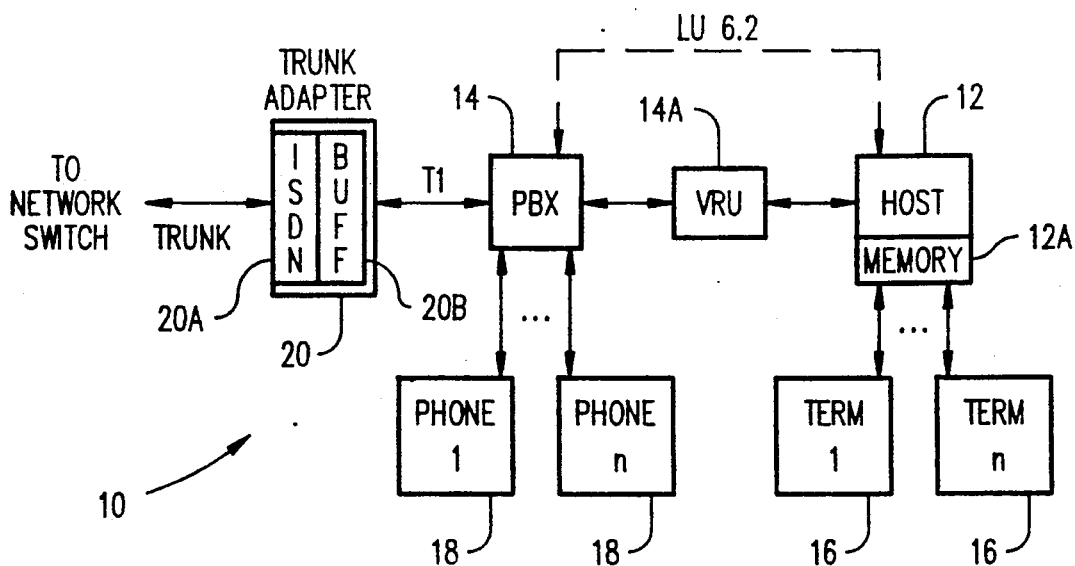
FIG. 1 is block diagram of a system constructed in accordance with the invention.

FIG. 1 illustrates in block diagram form a telephony system, in particular a Call Management Control System (CMCS) 10 that includes the teachings of the invention. System 10 in a presently preferred embodiment of the invention includes a host processor (Host) 12 that may be coupled via a Logical Unit (LU) 6.2 interface to a local branch exchange such as a Private Branch Exchange (PBX) 14. The local branch exchange may also be a Computerized Branch Exchange (CBX). The Host 12 includes a MEMORY 12A that is comprised of both temporary RAM and a mass storage device such as a magnetic disk or magnetic tape unit. Particularly suitable apparatus that embodies these functional blocks is described in detail in commonly assigned U.S. Pat. No. 4,805,209, issued Feb. 14, 1989. The disclosure of U.S. Pat. No. 4,805,209 is incorporated by reference herein in its entirety. Although the ensuing description is made in reference to a hardware and software system as described in U.S. Pat. No. 4,805,209 it should be realized that the teaching of the invention is not limited for use with only such a system and that, instead, the teaching of the invention is applicable to a large number of possible hardware and/or software embodiments.

The Host 12 may be a type of IBM System/370 processor, a description of which is found in a document entitled "S/370 Reference Summary, GX20-1850", published by the International Business Machines Corporation. While the Host 12 in a presently preferred embodiment of the invention is embodied in a S/370 processor it should be realized that the invention can be practiced with other mainframes, minicomputers or microprocessors.

The PBX 14 may be a PBX known in the art as a ROLM 8000 or a ROLM CBX II 9000, a description of which is found in a document entitled "ROLM CBX II 9000 Business Communications System", published by the ROLM Corporation (1986). It should be realized, however, that the invention can be practiced with other varieties of PBX or CBX equipment and, in general, with any PBX that supports ring-down of call connections from a network and which returns answer supervision to the network upon answer.

The LU 6.2 communication link between the Host 12 and the PBX 14 is a standard System Data Link Control (SDLC) communication link that corresponds to the LU 6.2 standard. A detailed description of a LU 6.2 communication link and a description of how to implement a program interface to conform with this standard is provided in the following documents published by the International Business Machines Corporation: "Systems Network Architecture: Sessions Between Logical Units, GC20-1868" and "SNA Transaction Programmer's Reference Manual For LU 6.2, GC30-3084". In other embodiments of the invention the link between the Host 12 and the PBX 14 may be other than a communication link that conforms to the LU 6.2 standard. In still other embodiments of the invention this link between the Host 12 and the PBX 14 is not required, the Host 12 instead being coupled to the PBX 14 through a Voice Response Unit as will be described.

As described in U.S. Pat. No. 4,805,209 there are coupled to Host 12 a plurality of user interface terminals, shown herein as terminals 16 (TERM 1 through TERM m). Coupled to PBX 14 are a plurality of phones, shown herein as phones 18 (PHONE 1 through PHONE n).

A Voice Response Unit (VRU) 14A, such as a type known in the art as an IBM 9270, is coupled between the PBX 14 and the Host 12. VRUs, such as the IBM 9270, may be employed to ring down callers to equipment that permits direct caller phone access to Host 12 data by using Dual Tone Multiple Frequency (DTMF) input with voice responses. The VRU 14A may subsequently employ PBX 14 features such as call transfer in order to transfer a caller to an agent if further assistance is required.

In accordance with a first embodiment of the invention there is also coupled to PBX 14, via a T1 tie link, a trunk adapter 20 that interfaces the PBX 14 to an ISDN phone trunk. The trunk adapter 20 may be a type known in the art as an IBM 9757. The phone trunk couples the PBX 14 to the network provider's switch (not shown) that generates the ANI and DNIS information.

In accordance with this embodiment of the invention the trunk adapter 20 includes an ISDN primary or basic interface 20A that receives ANI and/or DNIS information from the network provider's switch. The format of this information is in accordance with ISDN D Channel Signalling as defined by CCITT Standards Vol. III (ISDN 92-61-02081-X). The information is buffered (BUFF 20B) by the trunk adapter 20 and subsequently outpulsed as DTMF signals. The outpulsing of the ANI and/or DNIS information is delayed until after answer supervision is received from the PBX 14. The outpulsed information is transmitted in accordance with the protocol of the invention over an immediate start T1 tie through the PBX 14 and to the VRU 14A. The VRU 14A subsequently provides the ANI and/or DNIS information to the Host 12. As such, no modification of the PBX 14 is required in that the PBX 14 is essentially "transparent" to the DTMF tones that are used to convey the ANI and DNIS information from the trunk adapter 20 to the VRU 14A. In a presently preferred embodiment of the invention each DTMF tone has a duration of 80 milliseconds and is separated from other tones by intervals of 80 milliseconds.

In accordance with a second embodiment of the invention the network provider's switch employs a T1 trunk and DTMF tones in conjunction with the novel protocol of the invention to provide the ANI and DNIS information in response to receipt of the answer supervision signal. This information passes though the PBX 14 to the VRU 14A. In the second embodiment the functionality of the trunk adapter 20 may be considered to have been moved "upstream" and incorporated within the network provider's switch.

As such, the invention provides a novel protocol that allows ANI and DNIS capabilities to be exploited using any PBX, the use of the invention not requiring changes to an existing PBX interface. The protocol on the PBX 14 side of the connection is a standard trunk interface with ring-down to a single or a plurality of VRUs 14A. On the network side of the connection, protocol changes are made. The two embodiments of the invention relate to the network side of the PBX 14. A first embodiment uses the trunk adapter 20 to interface the PBX with standard E&M T1 while a second embodiment requires that the network provider switch implement the novel protocol.

Figure 2:
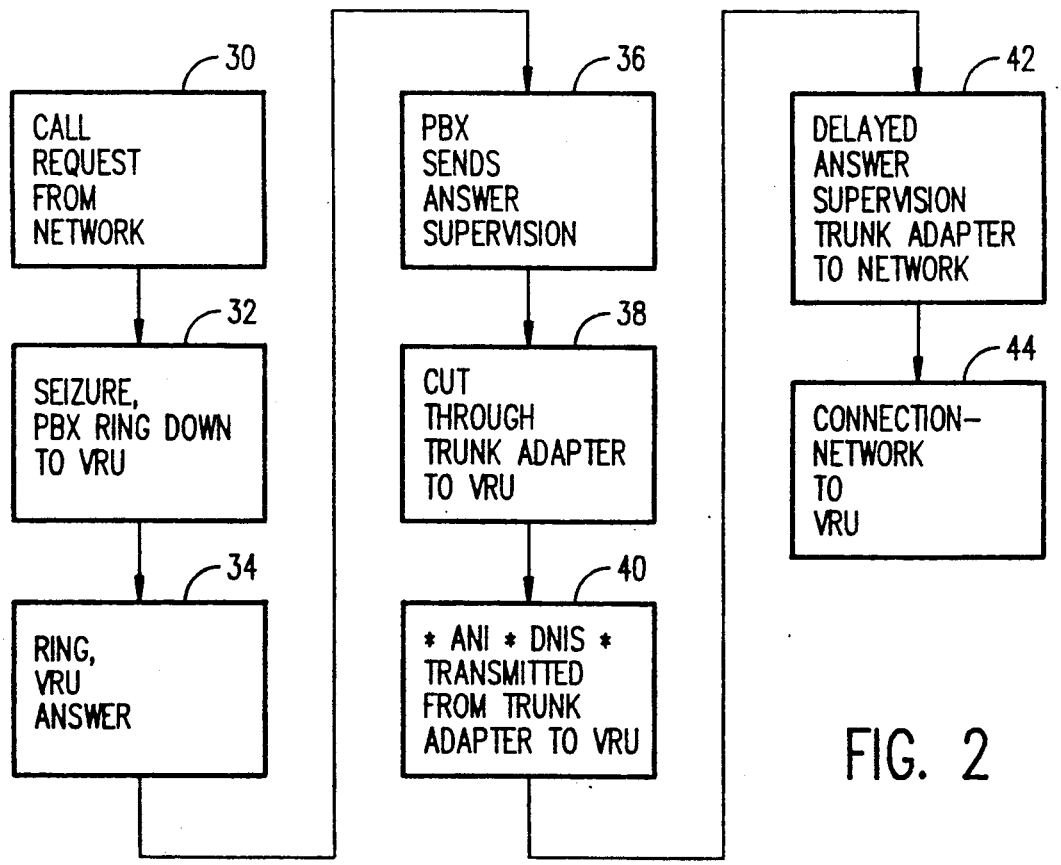
FIG. 2 is a flowchart illustrating a method of the invention.

As is shown in the flowchart of FIG. 2 an embodiment of the invention provides that the PBX 14 network interface, for example trunk adapter 20, outpulse previously received and buffered ANI and/or DNIS information after receiving answer supervision from the PBX 14. Thus, the PBX 14 routes a call to the VRU 14A using existing capabilities. That is, in response to call request from the network (block 30) a line is seized and the PBX 14 rings down to the VRU 14A (block 32). Upon the VRU 14A answering the call (block 34) the PBX 14 sends answer supervision (block 36) towards the network over the T1 line to indicate that the call has been accepted and that billing may begin. The trunk adapter 20 receives the answer supervision and the call path is cut through the PBX 14 connecting the VRU 14A to the trunk adapter 20 (block 38). The trunk adapter 20 outpulses ANI and/or DNIS information previously received from the network switch employing DTMF encoded digits having the format " * ANI * DNIS * " (block 40). The ANI and/or DNIS information is provided to the VRU 14A transparently through the PBX 14. The VRU 14A collects the ANI and DNIS information and sends it to the Host 12 where it is available to any application that may require the information for further call processing, as described below. At block 42 the trunk adapter 20 sends delayed answer supervision to the network switch and at block 42 the connection is made between the network provider's switch and the VRU 14A.

As examples of further call processing made possible by the use of the invention the Host 12 application may apply the ANI and the DNIS information against a customer business database to determine a phone number to send the caller to. The phone number chosen can be used to select an appropriate service group for the caller, may determine the caller's priority in a queue of calls waiting for service, or may display information on the identity of the caller. Alternatively, the VRU 14A that transfers the caller to the target phone number may stay on the call until the target agent answers at which time the VRU 14A speaks the caller's identification to the agent before hanging up. A determination that the agent has answered can be by a number of methods including having the agent enter a DTMF prompt to the VRU 14A, such as by hitting a predetermined key on the agents phone 18, or by using tone detection to detect the agent's voice when answering the call. In accordance with the disclosure of the aforementioned U.S. Pat. No. 4,805,209 the caller associated screen appearing on a VRU 14A terminal can also be made to display on the receiving agent's terminal 16 to identify the caller to the agent.

As was previously stated, upon the VRU 14A answering an incoming call the PBX 14 sends answer supervision towards the network and the call path is cut through the PBX 14 connecting the VRU 14A to the PBX 14. The network interface at this time outpulses DTMF digits having the format "* ANI * DNIS * " to the VRU 14A transparently through the PBX 14. Both ANI and DNIS are digits corresponding to the billing number of the call and the number dialed, respectively. Furthermore, if only ANI is provided by the network interface the ANI information is transmitted as "* ANI * *". If only DNIS is provided the format is "* * DNIS *. If neither type of information is available the format is "* * * ". In any event three phoneset star "*" digits are transmitted in accordance with the protocol of the invention, the first signalling to the VRU 14A the beginning of the DTMF packet of information, the second separating the ANI data field from the DNIS data field, and the third terminating the packet of information. As such, the invention accommodates variable numbers of digits in each of the fields.

The VRU 14A locally buffers the ANI and DNIS information and provides same to the Host 12. However, situations of overload may arise, such as having to place the incoming call into a queue, where the PBX 14 discards the ANI and DNIS information by sending answer supervision without connection to a VRU. In this case the network outpulses ANI and DNIS to the PBX which ignores the information.

The method and apparatus of the invention advantageously extends the collection of ANI and DNIS information directly by a VRU through any PBX that supports ring-down of call connections from a network and which returns answer supervision to the network upon VRU answer. The invention provides for ANI and DNIS information to be passed to Host 12 business applications, such as Host 12 directed call routing based on the identity of a caller and what service the caller has requested.

Thus, while the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent is:

1. A method for providing ANI and/or DNIS information from a network provider's switch to a network provider's user site, in response to an incoming call the method comprising the steps of:
returning towards the network provider's switch a signal indicating that the incoming call has been accepted at the network provider's user site;
transmitting information with DTMF signals towards a local branch exchange, the information being expressive of ANI and/or DNIS information, the DTMF signals being transmitted in accordance with a predetermined format that includes a predetermined signal indicating a beginning of the information; and
receiving at the user site the ANI and/or DNIS information.

2. A method as set forth in claim 1 wherein the predetermined format includes the following sequence:

* ANI * DNIS * where ANI are digits expressive of the billing number of the incoming call, where DNIS are digits expressive of the destination number of the incoming call, and wherein * is a phoneset star (*) digit.

3. A method as set forth in claim 1 wherein the step of transmitting is accomplished in part by a network adapter having an ISDN interface coupled to the network provider's switch and a T1 interface coupled to the local branch exchange, the step of transmitting including the steps of:
receiving in ISDN format the ANI and/or the DNIS information from the network provider's switch; and
transmitting in DTMF format the ANI and/or the DNIS information to the local branch exchange.

4. A method as set forth in claim 1 wherein the step of receiving includes the steps of:
passing the ANI and/or DNIS information through the local branch exchange; and
receiving the ANI and/or DNIS information with a Voice Response Unit coupled to the local branch exchange.

5. A method as set forth in claim 4 wherein the step of receiving the ANI and/or DNIS information with a Voice Response Unit includes an additional step of providing the ANI and/or DNIS information to a data processing means coupled to the Voice Response Unit.

6. A method as set forth in claim 5 and further including a step of employing the ANI and/or DNIS information to influence further processing of the incoming call.

7. A method as set forth in claim 5 and further including a step of employing the ANI and/or DNIS information as a factor in selecting a destination for the incoming call.

8. A method as set forth in claim 1 wherein the step of transmitting includes the step of transmitting in DTMF format the ANI and/or the DNIS information from the network providers switch to the local branch exchange.

9. A method for providing ANI and/or DNIS information from a network provider's switch to a network provider's customer site, in response to an incoming call the method comprising the steps of:
returning towards the network provider's switch a signal indicating that the incoming call has been accepted at the network provider's customer site;
transmitting information with DTMF signals in accordance with a predetermined format, the information being expressive of ANI and/or DNIS information, the step of transmitting including an initial step of
receiving in ISDN format the ANI and/or the DNIS information from the network provider's switch; and further including a step of
transmitting in DTMF format the ANI and/or the DNIS information transparently through a local branch exchange; wherein
the predetermined format includes the following sequence:

* ANI * DNIS * where ANI are digits expressive of the billing number of the incoming call, where DNIS are digits expressive of the destination number of the incoming call, and wherein * is a phoneset * digit;
the method further including the steps of receiving at the network provider's customer site the ANI and/or DNIS information; and providing the ANI and/or DNIS information to a data processing means to influence further processing of the incoming call.

10. A method as set forth in claim 9 wherein the step of receiving at the network provider's customer site the ANI and/or DNIS information and the step of providing are accomplished by receiving the DTMF signals with a Voice Response Unit, buffering the ANI and/or DNIS information within the Voice Response Unit, and transmitting the ANI and/or DNIS information from the Voice Response Unit to the data processing means.

11. Apparatus for providing ANI and/or DNIS information from a network provider's switch to a network provider's user site, comprising:

means responsive to an incoming call for returning towards the network provider's switch a delayed signal indicating that the incoming call has been accepted at the network provider's user site;

means for transmitting information with DTMF signals through a local branch exchange means, the information being expressive of ANI and/or DNIS information, the DTMF signals being transmitted in accordance with a predetermined format that includes a predetermined signal indicating a beginning of the information; and means for receiving the ANI and/or DNIS information.

12. Apparatus as set forth in claim 11 wherein the predetermined format includes the following sequence:

* ANI * DNIS * where ANI are digits expressive of the billing number of the incoming call, where DNIS are digits expressive of the destination number of the incoming call, and wherein * is a phoneset star digit.

13. Apparatus as set forth in claim 11 wherein the means for transmitting is comprised of a network adapter having ISDN interface means coupled to the network provider's switch and a T1 interface means coupled to a local branch exchange means, the network adapter means further having means for receiving in ISDN format the ANI and/or the DNIS information from the network provider's switch and means for transmitting in DTMF format the ANI and/or the DNIS information to the local branch exchange.

14. Apparatus as set forth in claim 11 wherein the means for receiving is comprised of a Voice Response Unit coupled to the local branch exchange means.

15. Apparatus as set forth in claim 14 wherein the local branch exchange means is comprised of a PBX or a CBX.

16. A method of providing ANI and/or DNIS information from a network to a user of the network, comprising a step of transmitting a packet of information using DTMF signals in accordance with a predetermined protocol having a formal "* ANI * DNIS * ", wherein ANI and DNIS each define a data field for expressing, when used, information corresponding to a billing number of a call and a number dialed, respectively, and wherein the first phoneset "*" digit indicates the beginning of the packet of information, the second phoneset "*" digit separates the ANI data field from the DNIS data field, and the third phoneset "*" digit terminates the packet of information.

* * * * *